United States Patent
Katano

(10) Patent No.: US 9,166,235 B2
(45) Date of Patent: Oct. 20, 2015

(54) FUEL CELL SYSTEM

(75) Inventor: Koji Katano, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 117 days.

(21) Appl. No.: 14/005,132

(22) PCT Filed: Mar. 8, 2012

(86) PCT No.: PCT/IB2012/000438
§ 371 (c)(1),
(2), (4) Date: Sep. 13, 2013

(87) PCT Pub. No.: WO2012/123794
PCT Pub. Date: Sep. 20, 2012

(65) Prior Publication Data
US 2014/0011109 A1    Jan. 9, 2014

(30) Foreign Application Priority Data
Mar. 17, 2011   (JP) .................................. 2011-058667

(51) Int. Cl.
*H01M 8/02* (2006.01)
*H01M 8/04* (2006.01)
*H01M 8/24* (2006.01)

(52) U.S. Cl.
CPC .......... *H01M 8/04201* (2013.01); *H01M 8/026* (2013.01); *H01M 8/2485* (2013.01); *H01M 2250/20* (2013.01); *Y02E 60/50* (2013.01); *Y02T 90/32* (2013.01)

(58) Field of Classification Search
CPC . H01M 8/026; H01M 8/0421; H01M 8/2485; H01M 8/2485
USPC .......................................................... 429/455
See application file for complete search history.

(56) References Cited

U.S. PATENT DOCUMENTS

| | | | |
|---|---|---|---|
| 2004/0247984 A1 | 12/2004 | Ismaier et al. | |
| 2008/0090122 A1* | 4/2008 | Andreas-Schott et al. | 429/25 |
| 2010/0040922 A1 | 2/2010 | Katano et al. | |
| 2010/0178576 A1 | 7/2010 | Olsommer et al. | |

FOREIGN PATENT DOCUMENTS

| | | | |
|---|---|---|---|
| CN | 102544552 A | * | 7/2012 |
| JP | 2005-505116 A | | 2/2005 |
| JP | 2005-203228 A | | 7/2005 |
| JP | 2008-130447 A | | 6/2008 |
| JP | 2009-512169 A | | 3/2009 |
| JP | 2010-055867 A | | 3/2010 |

OTHER PUBLICATIONS

Abstract of CN 102544552 A (Jul. 2012).*

* cited by examiner

*Primary Examiner* — Gregg Cantelmo
(74) *Attorney, Agent, or Firm* — Kenyon & Kenyon LLP

(57) ABSTRACT

A fuel cell system includes: a fuel cell stack in which end plates are respectively disposed at two ends of a unit-cell stack of unit cells in the stacking direction, and in which a fuel gas channel for conveying a fuel gas along surfaces of one of the end plates in a direction parallel to the surfaces of the one end plate is formed within the one end plate; an injector that is integrally provided in one of the surfaces of the one end plate and that injects the fuel gas into the fuel gas channel; and a relief valve that is integrally provided in the other of the surfaces of the one end plate and that prevents overpressure in the fuel gas channel. The relief valve is disposed at a position offset from an injection axis of the injector.

5 Claims, 3 Drawing Sheets

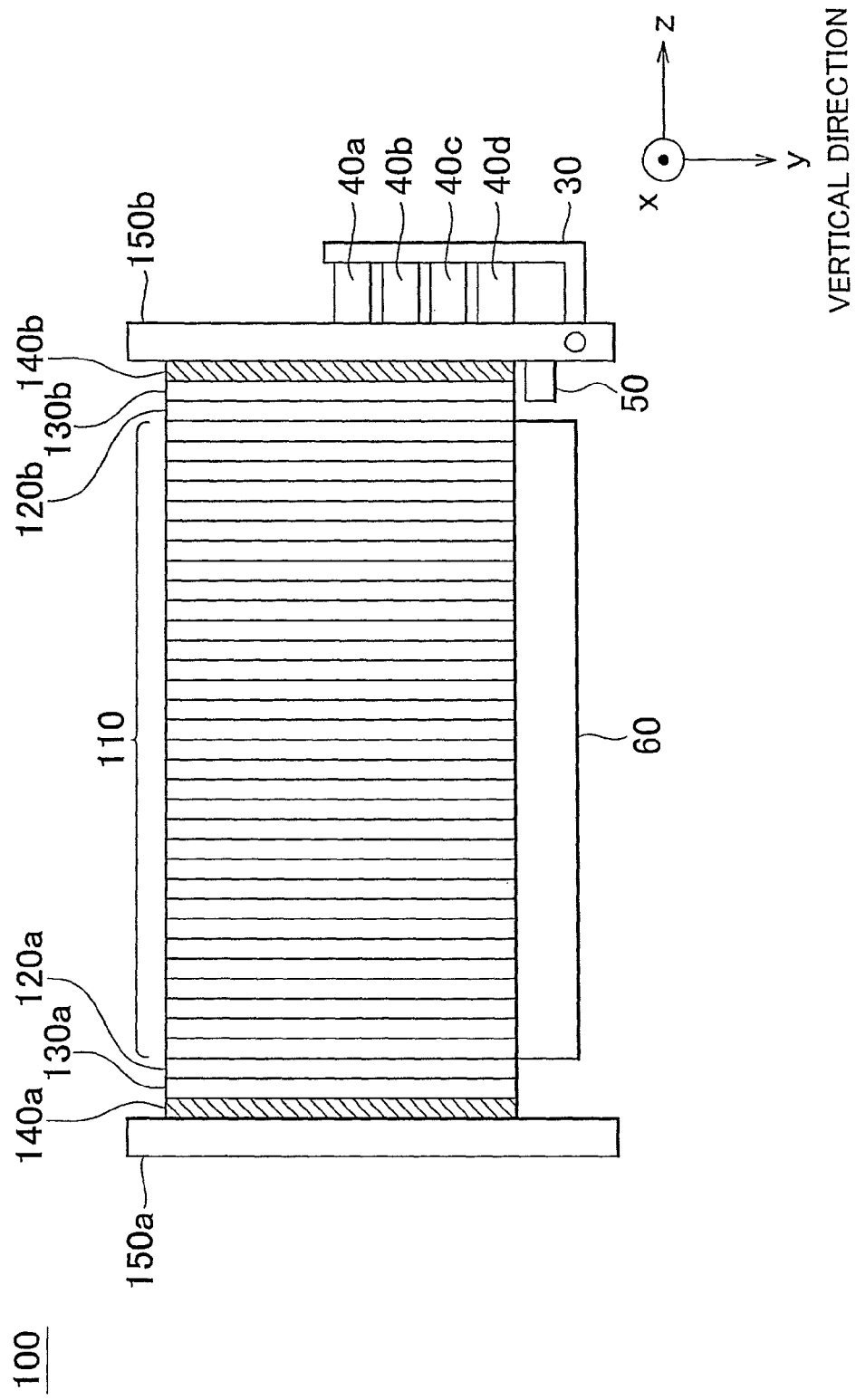

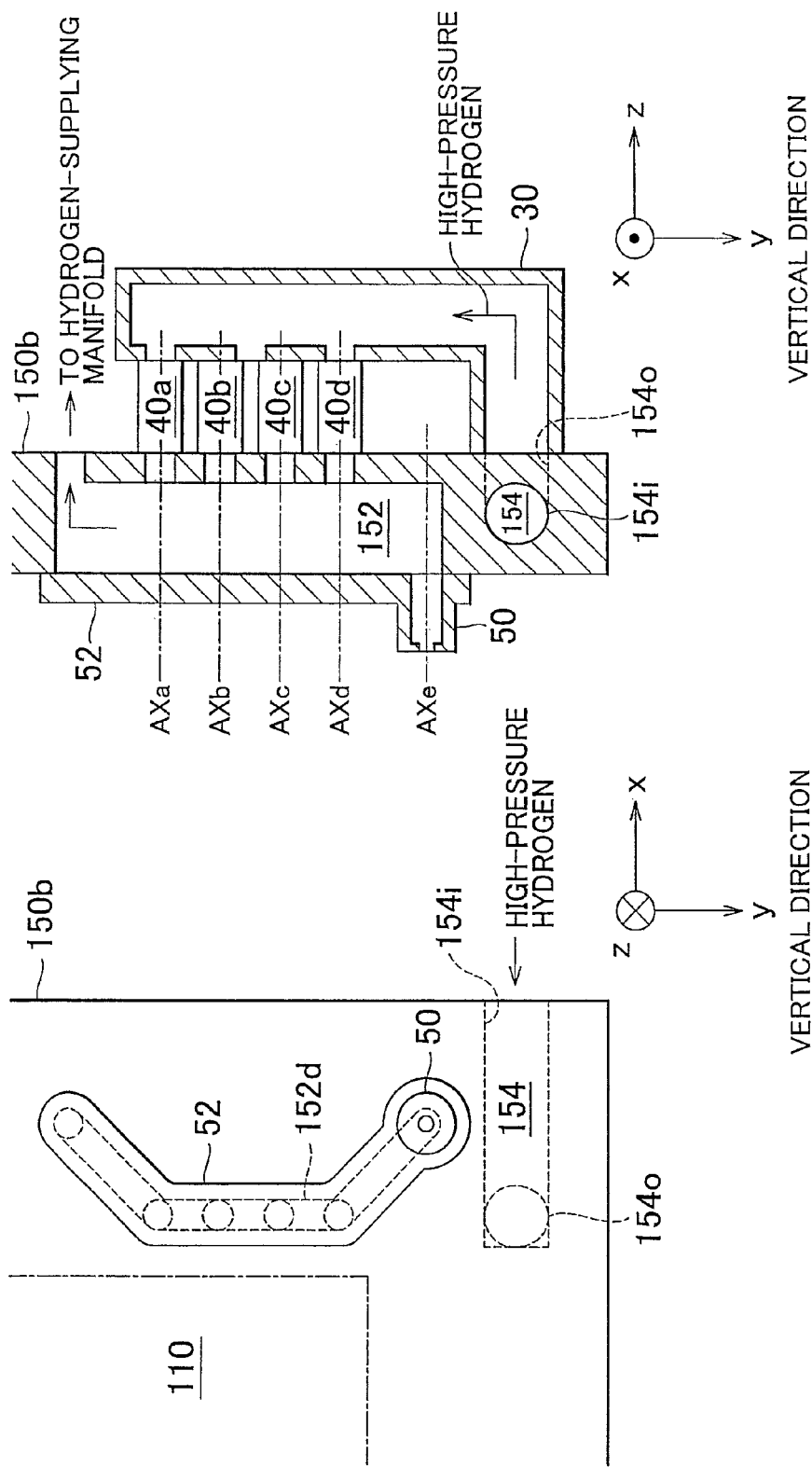

FUEL CELL SYSTEM

CROSS REFERENCE TO RELATED APPLICATIONS

This is a national phase application based on the PCT International Patent Application No. PCT/IB2012/000438 filed on Mar. 8, 2012, which claims foreign priority to Japanese Patent Application No. 2011-058667 filed on Mar. 17, 2011, the entire contents of which are incorporated herein by reference.

BACKGROUND OF THE INVENTION

1. Field of the Invention

The invention relates to a fuel cell system.

2. Description of Related Art

Fuel cells that generate electricity by an electrochemical reaction between a fuel gas and an oxidant gas are drawing attention as an energy source. The fuel cells are generally used in the form of a fuel cell stack obtained by stacking a plurality of unit cells. Then, in a fuel cell stack, an end plate is disposed at each of two opposite ends in the stacking direction in which the unit cells are stacked.

In a fuel cell system that includes such a fuel cell stack, a plurality of pipes for conveying the fuel gas, the oxidant gas and a cooling medium to the fuel cell stack are connected to the fuel cell stack. This piping structure is required to be compactly constructed in order to improve the ease of connecting the pipes and to reduce the size of the fuel cell system. To that end, a technology that integrates portions of the pipes that are connected to a fuel cell stack has been proposed (see, e.g., Japanese Patent Application Publication No. 2010-55867 (JP-A-2010-55867)).

A conceivable manner of constructing a compact piping structure connected to a fuel cell stack is a manner in which a fuel gas channel for conveying the fuel gas along surfaces of an end plate in a direction parallel to the surfaces, are formed in the interior of the end plate, and the end plate is integrated or consolidated with an injector that injects the fuel gas into the fuel gas channel and a relief valve for preventing overpressure in the fuel gas channel. Furthermore, in conjunction with this manner of construction, a construction in which the injector is disposed in one of the two surfaces of an end plate and the relief valve is disposed in the other surface of the end plate is conceivable. However, if an end plate is constructed as described above, the relief valve may malfunction due to the dynamic pressure of the fuel gas injected from the injector, depending on the positional relation between the injector and the relief valve.

SUMMARY OF THE INVENTION

The invention restrains the malfunction of a relief valve integrated with an end plate of a fuel cell stack in a fuel cell system.

An aspect of the invention relates to a fuel cell system. The fuel cell system includes: a fuel cell stack in which end plates are respectively disposed at two end portions of a unit-cell stack made by stacking a plurality of unit cells, the two end portions being end portions in a stacking direction of the unit cells, and in which a fuel gas channel for conveying a fuel gas along surfaces of one of the end plates in a direction parallel to the surfaces of the one end plate is formed within the one end plate; an injector that is integrally provided in one of the surfaces of the one end plate and that injects the fuel gas into the fuel gas channel; and a relief valve that is integrally provided in the other of the surfaces of the one end plate and that prevents overpressure in the fuel gas channel. The relief valve is disposed at a position offset from an injection axis of the injector.

In the fuel cell system of the foregoing aspect, the relief valve is disposed at the position offset from the position, in each surface of the one end plate of the fuel cell stack, of the injection axis of the injector, the fuel gas injected from the injector does not directly collide with a pressure-receiving surface of the relief valve. Therefore, the malfunction of the relief valve caused by the dynamic pressure of the fuel gas injected from the injector can be restrained.

In the fuel cell system of the foregoing aspect, the fuel gas channel may be formed by a groove portion provided to extend along the surfaces of the one end plate, and a lid member that covers the groove portion.

In the above-described fuel cell system, the end plate having therein the fuel gas channel can be relatively easily produced by casting, without a need to use a complicated processing technology.

In the fuel cell system of the foregoing aspect, the groove portion may be formed in a unit-cell stack-side surface of the one end plate, the unit-cell stack-side surface facing the unit-cell stack.

In the above-described fuel cell system, a dead space formed on the unit-cell stack-side of the end plate can be effectively utilized as a space in which a tool for attaching the lid member is inserted.

In the fuel cell system of the foregoing aspect, the lid member may be integrated with a body of the relief valve.

In the above-described fuel cell system, the lid member serves also as a body of the relief valve, so that the number of component parts can be reduced. Therefore, the man-hours for assembling the fuel cell system can be reduced.

In the fuel cell system of the foregoing aspect, a plurality of the injectors may be provided. The fuel cell system may further include: a high-pressure fuel gas channel that is formed within the one end plate, and that is provided for conveying a high-pressure fuel gas whose pressure is higher than pressure of the fuel gas that flows in the fuel gas channel, the high-pressure fuel gas channel having an inlet opening which is provided in a side surface of the one end plate and through which the high-pressure fuel gas is introduced, and an outlet opening which is formed in the one surface of the one end plate and through which the high-pressure fuel gas is discharged; and a high-pressure fuel gas pipe for supplying the high-pressure fuel gas discharged through the outlet opening to a primary side of the plurality of the injectors. The outlet opening and the plurality of the injectors may be arranged in a straight line in the one surface of the one end plate.

In the above-described fuel cell system, it is possible to use a straight pipe that is relatively easy to produce, as the high-pressure fuel gas pipe.

In the fuel cell system of the foregoing aspect, in the one surface of the one end plate, the outlet opening may be disposed at an extreme end in a direction in which the outlet opening and the plurality of injectors are arranged.

In the above-described fuel cell system, interference between the fuel gas channel and the high-pressure fuel gas channel can be prevented without a need to form a portion of the fuel gas channel where the four injectors are provided so that the portion of the fuel gas channel has a curved shape.

In addition to the above-described constructions as the fuel cell system, the invention can also be constructed as an end plate that is provided integrally with an injector and a relief valve, and as a fuel cell stack that includes the end plate.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is an illustrative diagram showing a construction of portions of the fuel cell system of the embodiment; and FIGS. 3A and 3B are illustrative diagrams that each show a construction of portions of an end plate.

DETAILED DESCRIPTION OF EMBODIMENTS

Embodiments of the invention will be described hereinafter with reference to the accompanying drawings.

A. Vehicle

Figure 1:
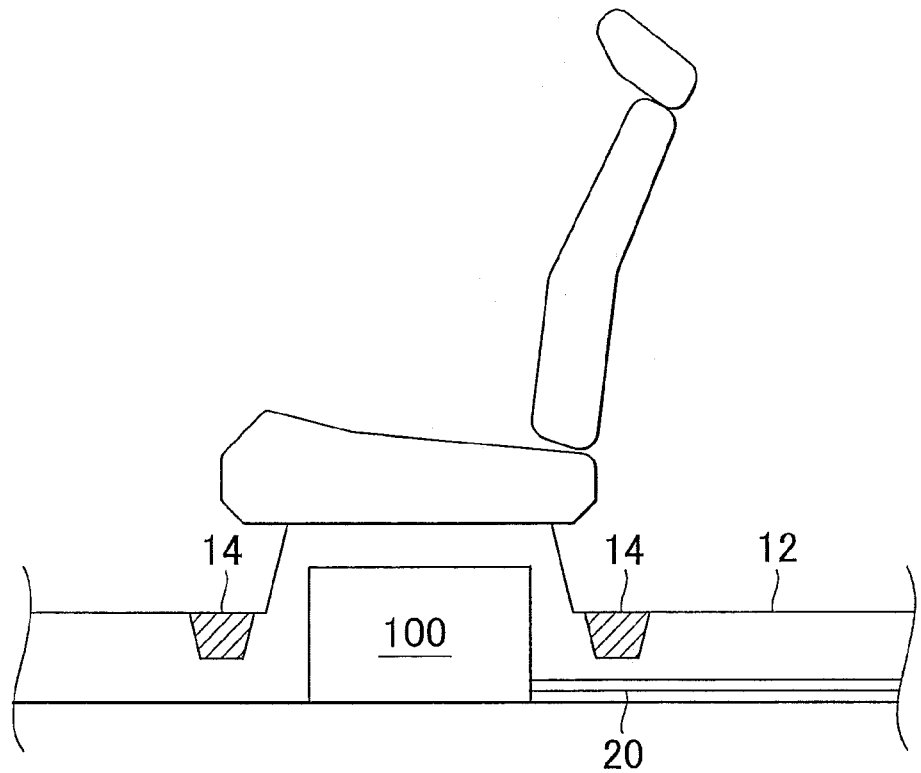
FIG. 1 is an illustrative diagram showing a construction of portions of a vehicle including a fuel cell system in accordance with an embodiment of the invention.
Figure 1:
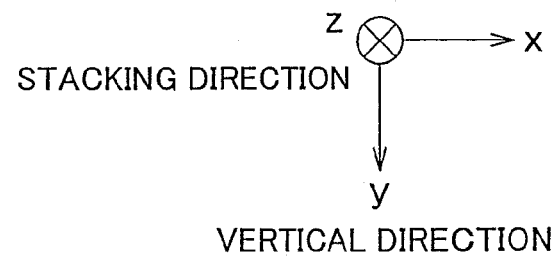

FIG. 1 is an illustrative diagram showing a construction of portions of a vehicle 10 including a fuel cell system in accordance with an embodiment of the invention. The vehicle 10 is a so-called electric vehicle (fuel cell vehicle), and includes a fuel cell system that includes a fuel cell stack 100 and a battery (not shown). The vehicle 10 moves by driving an electric motor (not shown) by the electric power generated by the fuel cell stack 100 or the electric power output from the battery and turning wheels by using the motive power of the electric motor. The electric power generated by the fuel cell stack 100 can also be stored into the battery.

In the vehicle 10 in accordance with the embodiment, the fuel cell stack 100 is housed in a stack case (not shown), and is disposed at a site below a floor 12 under a seat so that the stacking direction in which the unit cells of the fuel cell stack 100 are stacked coincides with a transverse direction of the vehicle 10 (a direction z shown in FIG. 1). Then, on a lower face of the floor 12, reinforcements 14 for restraining damage to the fuel cell stack 100 at the time of a side collision extend in the transverse direction of the vehicle 10 (the direction z shown in FIG. 1) in front of, and behind the fuel cell stack 100. A hydrogen supply pipe 20 for supplying hydrogen as a fuel gas to the fuel cell stack 100 from a hydrogen tank installed in a rear portion of the vehicle 10 is connected to a lower portion of a side surface of the fuel cell stack 100 (a lower portion of a side surface of an end plate 150b described below). Due to the construction in which the hydrogen supply pipe 20 is connected to the lower portion of the side surface of the fuel cell stack 100, it is possible to omit a process in which the hydrogen supply pipe 20 is bent in order to avoid interference of the hydrogen supply pipe 20 with either one of the reinforcements 14.

Although not shown in the drawings, various component parts that constitute the fuel cell system (e.g., the hydrogen tank, an air compressor, a radiator, various pipes, etc.) as well as an electric motor for turning wheels, and other functional component parts, etc. are disposed in spaces outside a cabin in the vehicle 10, such as a space below the floor 12 and spaces in front of, and behind the cabin.

B. Fuel Cell System

FIG. 2 is an illustrative diagram showing a construction of portions of the fuel cell system of this embodiment. The fuel cell system includes the fuel cell stack 100. As shown in FIG. 2, the fuel cell stack 100 is constructed by sequentially stacking, from an end of the stack 100, an end plate 150a, an electrically insulating plate 140a, a current collecting plate 130a, a heat insulating cell 120a that has heat insulation property, a unit-cell stack 110 obtained by stacking a plurality of unit cells, a heat insulating cell 120b, a current collecting plate 130b, an electrically insulating plate 140b, and the end plate 150b in that order. In the fuel cell stack 100, the heat insulating cells 120a and 120b may be omitted. In the unit-cell stack 110, the number of unit cells stacked can be arbitrarily set according to the output required of the fuel cell stack 100.

The end plates 150a and 150b are formed of a metal in order to secure rigidity. The electrically insulating plates 140a and 140b are formed by electrically insulating members made of for example, rubber or resin. The current collecting plates 130a and 130b are formed by gas-impermeable electrically conductive members such as dense carbon plates or copper plates. Each of the current collecting plates 130a and 130b is provided with an output terminal (not shown) so that the electric power generated by the fuel cell stack 100 can be output. In the fuel cell stack 100, a cell monitor 60 for monitoring the state of electricity generation of each unit cell (e.g., cell voltage) is connected to a lower side of the unit-cell stack 110.

In the fuel cell stack 100 of this embodiment, a hydrogen channel for conveying hydrogen as a fuel gas along the surfaces of the end plate 150b in a direction parallel to the surfaces, is formed within the end plate 150b as described below. Besides, four injectors 40a, 40b, 40c and 40d for injecting hydrogen into the hydrogen channel, a high-pressure hydrogen pipe 30 for supplying hydrogen to a primary side of the four injectors 40a, 40b, 40c and 40d (i.e., a side where hydrogen is received), and a relief valve 50 for preventing overpressure in the hydrogen channel are integrally connected to the end plate 150b. Connecting structures for these components will be described in detail below.

C. End Plate

FIGS. 3A and 3B are illustrative diagrams each of which shows a construction of portions of the end plate 150b. FIG. 3A shows a plan view of a lower right portion of the end plate 150b when seen from the unit-cell stack 110 (i.e., when seen from the −z side shown in the drawings). FIG. 3B shows a schematic sectional view of the portion of the end plate 150b that is shown in FIG. 3A, when seen from the side surface (i.e., when seen from the x side shown in the drawings).

As shown in FIGS. 3A and 3B, a groove portion 152d is formed in a unit-cell stack 110-side surface of the end plate 150b, the unit-cell stack 110-side surface facing the unit-cell stack 110. The groove portion 152d is covered with a lid member 52 that includes the relief valve 50. As the groove portion 152d is covered with the lid member 52 that includes the relief valve 50, a hydrogen channel 152 for conveying hydrogen along surfaces of the end plate 150b in the direction parallel to the surfaces, is formed within the end plate 150b. In this embodiment, the lid member 52 is integrated or consolidated with a body of the relief valve 50.

Besides, within a lower portion of the end plate 150b, a high-pressure hydrogen channel 154 for conveying high-pressure hydrogen whose pressure is higher than that of the hydrogen that flows in the hydrogen channel 152 is formed to extend along the surfaces of the end plate 150b, in a direction parallel to the surfaces of the end plate 150b (the −x direction shown in the drawings). This high-pressure hydrogen channel 154 has an inlet opening 154i through which high-pressure hydrogen is introduced and an outlet opening 154o through which high-pressure hydrogen is discharged. The inlet opening 154i is provided in a side surface of the end plate 150b. The outlet opening 154o is provided in a surface of the end plate 150b on a side opposite to the unit-cell stack 110 (a surface on the z side shown in the drawings). The hydrogen supply pipe 20 (see FIG. 1) is connected to the inlet opening 154i.

The surface of the end plate 150b on the side opposite to the unit-cell stack 110 is provided with the four injectors 40a, 40b, 40c and 40d for injecting hydrogen into the hydrogen channel 152. These four injectors 40a, 40b, 40c and 40d are disposed so that hydrogen is injected therefrom in a direction perpendicular to the surface of the end plate 150b. The four injectors 40a, 40b 40c and 40d disposed above the outlet opening 154o, and are arranged in a vertical direction (the y direction shown in the drawings). That is, in the end plate 150b, the outlet opening 154o and the four injectors 40a, 40b, 40c and 40d are arranged in a straight line, and the outlet opening 154o is disposed at the lowermost position (an extreme end) in the direction in which the outlet opening 154o and the four injectors 40a, 40b, 40c and 40d are arranged.

A high-pressure hydrogen pipe 30 for supplying the high-pressure hydrogen discharged through the outlet opening 154o to the primary side of the injectors 40a, 40b, 40c and 40d is connected to the outlet opening 154o and the primary side of the injectors 40a, 40b, 40c and 40d. This embodiment uses the four injectors 40a, 40b, 40c and 40d because the use of a plurality of small-size injectors that are relatively inexpensive makes it possible to stably supply hydrogen at low cost.

In the unit-cell stack 110-side surface of the end plate 150b, the relief valve 50 is disposed on an axis AXe that is offset from an injection axis AXa of the injector 40a, an injection axis AXb of the injector 40b, an injection axis AXc of the injector 40c and an injection axis AXd of the injector 40d. Besides, the relatively low-pressure hydrogen discharged from the hydrogen channel 152 is supplied to a hydrogen-supplying manifold of the fuel cell stack 100 through a pipe (not shown). In other words, in the unit-cell stack 110-side surface of the end plate 150b, the relief valve 50 is disposed at a position that is offset from the injection axis AXa of the injector 40a, the injection axis AXb of the injector 40b, the injection axis AXc of the injector 40c and the injection axis AXd of the injector 40d in the vertical direction and the horizontal direction.

In the above-described fuel cell system of the embodiment, since the relief valve 50 is disposed at the position (on the axis AXe) that is offset from the positions, in each surface of the end plate 150b of the fuel cell stack 100, of injection axes AXa, AXb, AXc and AXd of the injectors 40a, 40b, 40c and 40d, the hydrogen injected from the injectors 40a, 40b, 40c and 40d does not directly collide with a pressure receiving surface of the relief valve 50. Therefore, the malfunction of the relief valve 50 caused by the dynamic pressure of the hydrogen injected from the injectors 40a, 40b, 40c and 40d can be restrained.

Besides, in the fuel cell system of the embodiment, since the hydrogen channel 152 is constructed of the groove portion 152d formed in the end plate 150b and the lid member 52 (that includes the relief valve 50), the end plate 150b can be relatively easily produced by casing, without a need to use a complicated processing technology.

Besides, since the groove portion 152d is formed in the unit-cell stack 110-side surface of the end plate 150b, a dead space formed on the unit-cell stack 110-side of the end plate 150b can be effectively utilized as a space in which a tool for attaching the lid member 52 (that includes the relief valve 50) is inserted.

Besides, since the lid member 52 is consolidated with the body of the relief valve 50, the lid member 52 serving as the body of the relief valve 50 reduces the number of component parts. Therefore, the man-hours for assembling the fuel cell system can be reduced.

Besides, in the fuel cell system in the embodiment, since the outlet opening 154o and the four injectors 40a, 40b, 40c and 40d are arranged in a straight line in one of the two opposite surfaces of the end plate 150b, it is possible to use a straight pipe that is relatively easy to produce, as the high-pressure hydrogen pipe 30.

Besides, since in one of the two opposite surfaces of the end plate 150b, the outlet opening 154o is disposed at an extreme end (the lowermost position) in the direction in which the outlet opening 154o and the four injectors 40a, 40b, 40c and 40d are arranged, interference between the hydrogen channel 152 and the high-pressure hydrogen channel 154 can be prevented without a need to form a portion of the hydrogen channel 152 where the four injectors 40a, 40b, 40c and 40d are provided so that the portion of the hydrogen channel has a curved shape.

D. Modifications

While the embodiment of the invention has been described above, it is to be understood that the invention is not limited at all by the foregoing embodiment or the like, but can be carried out in various modes without departing from the scope of the invention. For example, the following modifications are possible.

D1. Modification 1

Although in the foregoing embodiment, the four injectors 40a, 40b, 40c and 40d are connected to the end plate 150b, the invention is not limited to this configuration. The number of injectors may be arbitrarily set.

D2. Modification 2

Although in the foregoing embodiment, the hydrogen channel 152 in the end plate 150b is formed by the groove portion 152d and the lid member 52 (that includes the relief valve 50), the invention is not limited to this configuration. The hydrogen channel 152 may also be formed in the end plate 150b by using a relatively complicated processing technology other than casting.

D3. Modification 3

Although in the foregoing embodiment, the groove portion 152d of the end plate 150 is formed in the unit-cell stack 110-side surface of the end plate 150b, the invention is not limited to this configuration. The groove portion 152d may be formed at a site other than the unit-cell stack 110-side surface.

D4. Modification 4

Although in the foregoing embodiment, the lid member 52 is consolidated with the body of the relief valve 50, the invention is not limited to the configuration. The relief valve 50 and the lid member 52 may be provided as separate members.

D5. Modification 5

In the end plate 150b of the foregoing embodiment, various modifications or changes may be appropriately made to the configuration of the hydrogen channel 152, the arrangement of the injectors, the configuration of the high-pressure hydrogen channel 154, the arrangement of the inlet opening 154i and the outlet opening 154o. Generally, in the invention, it is necessary that the relief valve should be disposed at a position that is offset from the position, in each surface of the end plate of the fuel cell stack, of the injection axis of an injector.

What is claimed is:
1. A fuel cell system comprising:
 a fuel cell stack in which end plates are respectively disposed at two end portions of a unit-cell stack made by stacking a plurality of unit cells, the two end portions being end portions in a stacking direction of the unit cells, and in which a fuel gas channel extends for conveying a fuel gas is formed within the one end plate;
an injector that is integrally provided on an outer surface of the one end plate and that injects the fuel gas into the fuel gas channel; and
a relief valve that is integrally provided on an inner surface of the one end plate and that prevents overpressure in the fuel gas channel, wherein
the relief valve is disposed at a position offset from an injection axis of the injector,
wherein a plurality of the injectors are provided, and
wherein the fuel cell system further includes: a high-pressure hydrogen fuel gas channel that is formed within the one end plate, and that is provided for conveying a high-pressure fuel gas whose pressure is higher than pressure of the fuel gas that flows in the fuel gas channel, the high-pressure hydrogen fuel gas channel having an inlet opening which is provided in a side surface of the one end plate and through which the high-pressure fuel gas is introduced, and an outlet opening which is formed in the outer surface of the one end plate and through which the high-pressure fuel gas is discharged; and a high-pressure hydrogen fuel gas pipe for supplying the high-pressure fuel gas discharged through the outlet opening to a primary side of the plurality of the injectors, and
wherein the outlet opening and the plurality of the injectors are arranged in a straight line on the outer surface of the one end plate.

2. The fuel cell system according to claim 1, wherein the fuel gas channel is formed by a groove portion provided to extend along the outer surface of the one end plate, and a lid member that covers the groove portion.

3. The fuel cell system according to claim 2, wherein the lid member is integrated with a body of the relief valve.

4. The fuel cell system according to claim 1, wherein in the outer surface of the one end plate, the outlet opening is disposed at an extreme end in a direction in which the outlet opening and the plurality of the injectors are arranged.

5. The fuel cell system according to claim 4, wherein in the outer surface of the one end plate, the outlet opening is disposed at a lowermost position in the direction in which the outlet opening and the plurality of the injectors are arranged.

* * * * *